United States Patent
Desbois et al.

(10) Patent No.: US 9,486,981 B2
(45) Date of Patent: Nov. 8, 2016

(54) USE OF POLYETHYLENEIMINES IN THE PREPARATION OF POLYAMIDES

(75) Inventors: Philippe Desbois, Edingen-Neckarhausen (DE); Andreas Wollny, Ludwigshafen (DE); Andreas Radtke, Mannheim (DE); Bernd Bruchmann, Freinsheim (DE); Anna Karina Möller, Darmstadt (DE)

(73) Assignee: BASF SE, Ludwigshafen (DE)

( * ) Notice: Subject to any disclaimer, the term of this patent is extended or adjusted under 35 U.S.C. 154(b) by 408 days.

(21) Appl. No.: 13/612,382

(22) Filed: Sep. 12, 2012

(65) Prior Publication Data

US 2013/0065466 A1 Mar. 14, 2013

Related U.S. Application Data

(60) Provisional application No. 61/533,811, filed on Sep. 13, 2011.

(51) Int. Cl.

| | |
|---|---|
| *C08G 69/16* | (2006.01) |
| *B32B 5/02* | (2006.01) |
| *C08G 69/18* | (2006.01) |
| *B32B 5/12* | (2006.01) |
| *B32B 5/26* | (2006.01) |
| *B32B 5/28* | (2006.01) |
| *C08L 39/04* | (2006.01) |

(52) U.S. Cl.
CPC ............ *B32B 5/024* (2013.01); *B32B 5/028* (2013.01); *B32B 5/12* (2013.01); *B32B 5/26* (2013.01); *B32B 5/28* (2013.01); *C08G 69/16* (2013.01); *C08G 69/18* (2013.01); *B32B 2250/05* (2013.01); *B32B 2250/20* (2013.01); *B32B 2260/023* (2013.01); *B32B 2260/046* (2013.01); *B32B 2262/0269* (2013.01); *B32B 2262/101* (2013.01); *B32B 2262/106* (2013.01); *C08L 39/04* (2013.01); *Y10T 442/184* (2015.04); *Y10T 442/191* (2015.04); *Y10T 442/20* (2015.04); *Y10T 442/30* (2015.04); *Y10T 442/40* (2015.04); *Y10T 442/60* (2015.04); *Y10T 442/697* (2015.04)

(58) Field of Classification Search
CPC ...... C08L 39/04; C08L 77/02; C11D 3/3719; C08G 69/14; C08G 69/18; C08G 69/16
See application file for complete search history.

(56) References Cited

U.S. PATENT DOCUMENTS

| | | | | |
|---|---|---|---|---|
| 3,419,517 A | * | 12/1968 | Hedrick et al. | ............... 523/213 |
| 4,028,287 A | * | 6/1977 | Sato et al. | .................... 521/110 |
| 4,144,123 A | | 3/1979 | Scharf et al. | |
| 4,371,674 A | | 2/1983 | Hertel et al. | |
| 5,536,370 A | | 7/1996 | Scherr et al. | |
| 5,641,855 A | | 6/1997 | Scherr et al. | |
| 6,063,286 A | | 5/2000 | Steuerle et al. | |
| 6,391,982 B1 | * | 5/2002 | Haeger et al. | ................ 525/417 |
| 2011/0288258 A1 | * | 11/2011 | Desbois | ............ C08G 18/8074 528/45 |

FOREIGN PATENT DOCUMENTS

| | | |
|---|---|---|
| CA | 2370380 A1 | 10/2000 |
| DE | 19931720 A1 | 1/2001 |
| EP | 25515 A1 | 3/1981 |
| EP | 675914 A1 | 10/1995 |
| EP | 895521 A1 | 2/1999 |
| WO | WO-94/12560 A1 | 6/1994 |

* cited by examiner

*Primary Examiner* — Gregory Listvoyb
(74) *Attorney, Agent, or Firm* — Drinker Biddle & Reath LLP

(57) ABSTRACT

The present invention relates to a process for preparing a composition comprising (A) at least one lactam, (B) at least one catalyst, (C) an activator from the group consisting of isocyanates, acid anhydrides, acyl halides, reaction products thereof with (A) and mixtures thereof, (D) at least one polyethyleneimine. The invention likewise relates to a composition comprising (i) 0.01 to 10 wt %, based on the sum total of components (A) and (D), of at least one polyethyleneimine, and (ii) 90 to 99.99 wt %, based on the sum total of components (A) and (D), of at least one lactam (A) and/or polyamide obtainable from (A).

6 Claims, No Drawings

USE OF POLYETHYLENEIMINES IN THE PREPARATION OF POLYAMIDES

CROSS-REFERENCE TO RELATED APPLICATIONS

This application claims the benefit of U.S. Provisional Application 61/533,811, filed Sep. 13, 2011, which is incorporated herein by reference.

The present invention relates to a process for preparing a composition comprising
- (A) at least one lactam,
- (B) at least one catalyst,
- (C) an activator from the group consisting of isocyanates, acid anhydrides, acyl halides, reaction products thereof with (A) and mixtures thereof,
- (D) at least one polyethyleneimine.

The invention likewise relates to a composition comprising
- (i) 0.01 to 10 wt %, based on the sum total of components (A) and (D), of at least one polyethyleneimine, and
- (ii) 90 to 99.99 wt %, based on the sum total of components (A) and (D), of at least one lactam (A) and/or polyamide obtainable from (A).

The invention also relates to a process for preparing a molding comprising the steps of
- (a) mixing separately prepared melts
  - s1) comprising at least one lactam (A), an activator (C) and at least one polyethyleneimine (D), and
  - s2) comprising at least one lactam (A) and at least one catalyst (B),
- (b) injecting the combined melts s1) and s2) into a hot mold with inserted textile structure,
- (c) ejecting the resulting molding.

The present invention further relates to moldings obtainable by the described process.

Lactams, such as caprolactam, are polymerizable in an anionic polymerization. The preparation of molded polyamide articles is known per se to a person skilled in the art.

Anionic polymerization usually involves a lactam being reacted with a catalyst and an activator.

Charlesby, A., Nature 1953, 171, 167 and Deeley, C., J. Appl. Phys. 1957, 28, 1124-1130 disclose irradiation as a way of crosslinking injection-molded thermoplastics such as polyamides. In the process described, an additive is added to the polyamide during polymerization or compounding. Subsequent to the injection-molding operation, this additive is externally stimulated by radiation to react with the polyamide chain to crosslink it for example.

The problem addressed by the present invention was that of providing a polyamide preparation process which gives access to highly crosslinked polyamides.

There was also to be provided a process that makes polyamides of high swellability available. High swellability here serves as a measure of a high degree of crosslinking. At the same time, however, the optimized properties such as the viscosity of the prior art standard system comprising lactam and activator/catalyst were to be changed as little as possible.

In addition, the process was to provide a system useful for preparing reinforced and filled polyamide moldings. More particularly, textile reinforcing materials were to be incorporable in the polyamide composition.

The problem was solved according to the present invention by using a polyethyleneimine as a further additive which has a crosslinking effect even in minimal amounts.

As set forth at the beginning, the present invention utilizes at least one lactam as component (A). Especially caprolactam, piperidone, pyrrolidone or laurolactam is useful as lactam. Mixtures of different lactams can also be used. Preference is given to using caprolactam, laurolactam or mixtures thereof. Particular preference for use as component (A) is given to caprolactam or laurolactam.

One embodiment utilizes a mixture of lactam and lactone as component (A) and not a lactam. Caprolactone and butyrolactone are useful as lactones for example.

When a lactone is used as comonomer, it is typically used in amounts of 0.01 to 40 wt % based on total monomer. The proportion of lactone as comonomer is preferably in the range from 0.01 to 30 wt %, and more preferably in the range from 0.01 to 20 wt %, based on total monomer.

One preferred embodiment of the invention utilizes exclusively lactams as component (A).

The process according to the present invention utilizes a catalyst (B). A catalyst for anionic polymerization is herein to be understood as being a compound enabling the formation of lactam anions. Lactam anions per se can likewise function as a catalyst.

Catalysts of this type are known for example from Polyamide, Kunststoffhandbuch, 1998, Karl Hanser Verlag. The present invention preferably utilizes a catalyst (B) selected from the group consisting of alkali metal caprolactamates such as sodium caprolactamate, potassium caprolactamate, alkaline earth metal caprolactamates such as bromide magnesium caprolactamate, chloride magnesium caprolactamate, magnesium biscaprolactamate, alkali metal bases, for example sodium or sodium bases such as sodium hydride, sodium, sodium hydroxide, sodium methoxide, sodium ethoxide, sodium propoxide, sodium butoxide, for example potassium or potassium bases such as potassium hydride, potassium, potassium hydroxide, potassium methoxide, potassium ethoxide, potassium propoxide, potassium butoxide and mixtures thereof, preferably consisting of sodium caprolactamate, potassium caprolactamate, bromide magnesium caprolactamate, chloride magnesium caprolactamate, magnesium biscaprolactamate, sodium hydride, sodium, sodium hydroxide, sodium ethoxide, sodium methoxide, sodium propoxide, sodium butoxide, potassium hydride, potassium, potassium hydroxide, potassium methoxide, potassium ethoxide, potassium propoxide, potassium butoxide and mixtures thereof.

Particular preference is given to using a catalyst (B) selected from the group consisting of sodium hydride, sodium and sodium caprolactamate and mixtures thereof; sodium caprolactamate is particularly preferred. The catalyst can be used as a solid or in solution. The catalyst is preferably used as a solid. The catalyst is preferably introduced into a caprolactam melt in which it can dissolve.

The molar ratio of lactam (A) to catalyst (B) can be varied within wide limits and generally it is in the range from 1:1 to 10 000:1, preferably in the range from 5:1 to 1000:1 and more preferably in the range from 1:1 to 500:1.

Activator (C) for the anionic polymerization is a compound selected from the group of lactams N-substituted by electrophilic moieties, aliphatic diisocyanates, aromatic diisocyanates, polyisocyanates, aliphatic diacyl halides and aromatic diacyl halides. Mixtures thereof can also be used as activator (C).

Lactams N-substituted by electrophilic moieties include for example acyllactams. Activator (C) can also be a precursor to such an activated N-substituted lactam, which combines with lactam (A) in situ to form an activated lactam.

Aliphatic diisocyanates useful as activator (C) include compounds such as butylene diisocyanate, hexamethylene diisocyanate, octamethylene diisocyanate, decamethylene diisocyanate, undodecamethylene diisocyanate, dodecamethylene diisocyanate, 4,4'-methylenebis(cyclohexyl isocyanate), isophorone diisocyanate, aromatic diisocyanates, such as tolyl diisocyanate, 4,4'-methylenebis(phenyl)isocyanate or polyisocyanates (for example isocyanates of hexamethylene diisocyanate; Basonat HI 100/BASF SE), allophanates (for example ethyl allophanate). Especially mixtures of the compound mentioned can be used as activator (C).

Useful aliphatic diacyl halides include compounds such as butylene diacyl chloride, butylene diacyl bromide, hexamethylene diacyl chloride, hexamethylene diacyl bromide, octamethylene diacyl chloride, octamethylene diacyl bromide, decamethylene diacyl chloride, decamethylene diacyl bromide, dodecamethylene diacyl chloride, dodecamethylene diacyl bromide, 4,4'-methylenebis(cyclohexyl acid chloride), 4,4'-methylenebis(cyclohexyl acid bromide), isophorone diacyl chloride, isophorone diacyl bromide; as well as aromatic diacyl halides, such as tolylmethylene diacyl chloride, tolylmethylene diacyl chloride, 4,4'-methylenebis(phenyl)acid chloride, 4,4'-methylenebis(phenyl)acid bromide. Especially mixtures of the compound mentioned can be used as activator (C). One preferred embodiment utilizes as activator (C) at least one compound selected from the group comprising hexamethylene diisocyanate, isophorone diisocyanate, hexamethylene diacyl bromide, hexamethylene diacyl chloride or mixtures thereof; particular preference is given to using hexamethylene diisocyanate. The activator (C) can be used in solution. More particularly, the activator can be dissolved in caprolactam. An example of a useful activator (C) is Brüggolen® C20, 80% caprolactam-blocked 1,6-hexamethylene diisocyanate in caprolactam from Brüggemann, Germany.

The amount of activator (C) defines the number of growing chains, since every activator molecule represents the initial member of a polymer chain. The molar ratio of lactam (A) to activator (C) can be varied within wide limits and is generally in the range from 1:1 to 10 000:1, preferably in the range from 5:1 to 2000:1, and more preferably in the range from 20:1 to 1000:1.

Component (D) in the present invention is a polyethyleneimine or a mixture of polyethyleneimines. Hyperbranched polyethyleneimines can be used in the present invention. The average molecular weight (weight average) of polyethyleneimine (D) is typically in the range from 100 to 3 000 000 g/mol and preferably in the range from 500 to 50 000 g/mol, as determined via light scattering. The measurement can be carried out in hexafluoroisopropanol (HFIP) at 40° C. The polymers used can have an amino functionality of primary and/or secondary amino groups in the range from 10 to 70 000 and especially from 10 to 10 000 per chain and more preferably in the range from 20 to 500 per chain. Amino functionality can be determined from the distribution of the amino groups as is determinable from NMR measurements.

Polyethyleneimine in the present invention is to be understood as meaning not only homopolymers but also copolymers, obtainable for example as described in WO 94/12560 according to the methods in Ullmann Electronic Release under the headword "Aziridines".

The homopolymers are generally obtainable by polymerization of ethyleneimine (aziridine) in aqueous or organic solution in the presence of acid-detaching compounds, acids or Lewis acids. Homopolymers of this type are branched polymers generally comprising primary, secondary and tertiary amino groups in a ratio of about 30%:40%:30%. This distribution of amino groups is generally determinable via 13C NMR spectroscopy. The distribution is preferably in the range from 1:0.8:0.5 to 1:1.3:0.8.

Comonomers used are preferably compounds having at least two amino functions. Useful comonomers include for example alkylenediamines having 2 to 10 carbon atoms in the alkylene moiety, in which case ethylenediamine and propylenediamine are preferred. Useful comonomers further include triamines such as diethylenetriamine, triethylenetetramine, tetraethylenepentamine, dipropylenetriamine, tripropylene-tetramine, dihexamethylenetriamine, aminopropylethylenediamine and bisamino-propylethylenediamine.

Useful polyethyleneimines further include crosslinked polyethyleneimines, which are obtainable by reaction of polyethyleneimines with bi- or polyfunctional crosslinkers having at least one halohydrin, glycidyl, aziridine or isocyanate unit, or at least one halogen atom, as functional group. Examples of such crosslinkers are epichlorohydrin or bischlorohydrin ethers of polyalkylene glycols having 2 to 100 ethylene oxide and/or propylene oxide units as well as the compounds recited in DE-A 19 93 17 20 and U.S. Pat. No. 4,144,123. Processes for preparing crosslinked polyethyleneimines are known inter alia from the above-cited references and also EP-A 895 521 and EP-A 25 515.

Polyethyleneimines used can also be grafted, in which case any compound capable of reacting with the amino or imine groups of the polyethyleneimines can be used as grafting agent. Useful grafting agents and processes for preparing grafted polyethyleneimines are discernible from EP-A 675 914 for example.

Polyethyleneimines useful for the purposes of the invention further include amidated polymers typically obtainable by reaction of polyethyleneimines with carboxylic acids, carboxylic esters, carboxylic anhydrides, carboxamides or carbonyl halides. Depending on the proportion of amidated nitrogen atoms in the polyethyleneimine chain, the amidated polymers can subsequently be crosslinked with the crosslinkers mentioned. Preferably, up to 30% of the amino functions are amidated in order that there may still be sufficient primary and/or secondary nitrogen atoms available for a subsequent crosslinking reaction.

It is also possible to use alkoxylated polyethyleneimines obtainable for example by reaction of polyethyleneimines with ethylene oxide and/or propylene oxide. Alkoxylated polymers of this type are subsequently crosslinkable.

Useful polyethyleneimines according to the present invention further include hydroxyl-containing polyethyleneimines and amphoteric polyethyleneimines (incorporation of anionic groups) and also lipophilic polyethyleneimines, generally obtained by incorporating long-chain hydrocarbon moieties in the polymer chain. Processes for preparing polyethyleneimines of this type are known to a person skilled in the art.

Suitable polyethyleneimines are available under the Lupasol® brand (from BASF SE, Ludwigshafen) for example.

In one embodiment of the invention, the amount of substance ratio of reactive groups of activator (C) to NH and/or $NH_2$ groups of polyethyleneimine (D) is in the range from 1:2 to 10:1.

The amount of substance of the NH and/or $NH_2$ groups of the polyethyleneimine is determined from the molar mass of the polyethyleneimine, determined via light scattering tests, and the distribution of the various amino groups, which is determined from 13C NMR measurements. This is done on the assumption that an average amino/imino group unit has a molar mass of 44 g/mol. From the data thus given, the masses weighed out can be arithmetically converted into an amount of substance for NH and/or $NH_2$ groups.

The amount of substance of the NCO groups of the activator can in turn be computed from the concentration of the activator for example CL-blocked hexamethylene diisocyanate (HDI) in for example caprolactam via the amount of substance of the activator.

The invention further relates to the composition obtainable via the process mentioned above. More particularly, the present invention relates to a composition comprising from 0.01 to 10 wt % and preferably from 0.3 to 1 wt % based on the sum total of components (A) and (D) of at least one polyethyleneimine and from 90 to 99.99 wt % and preferably 99.7 to 99 wt % based on the sum total of components (A) and (D) of at least one lactam.

In addition to components (A) to (D), the composition may further comprise further added substances (E). The further added substances are added to adjust the properties of the polyamide obtained from the lactam. Typical added substances include for example plasticizers, impact modifiers, dyes, demolding agents, viscosity enhancers or flame retardants.

The present invention further concerns the composition obtainable from the process described.

More particularly, the invention concerns a composition comprising
  (i) 0.01 to 10 wt %, based on the sum total of components (A) and (D), of at least one polyethyleneimine, and
  (ii) 90 to 99.99 wt %, based on the sum total of components (A) and (D), of at least one lactam and/or polyamide obtainable from (A).

In a further embodiment of the invention, the composition which may comprise components (A) to (D) and optionally (E) can be heated to a temperature suitable for polymerizing lactam. Heating the composition to a temperature suitable for polymerizing the lactam generally leads to a thermoset. More particularly, the composition comprising components (A) to (D) and optionally (E) can be heated to 40-240° C. preferably 100-170° C. The composition can expressly also be heated without textile structure.

When the composition is heated without textile structure, the polyamide thus obtainable can have a swellability of 1 to 50, especially of 1 to 40, preferably of 1 to 35 for example of 1 to 31, measured in hexafluoroisopropanol. Suitable conditions for measurement are discernible from the example part.

The invention also relates to processes for preparing a molding comprising the steps of
  (a) mixing separately prepared melts
    s1) comprising at least one lactam (A), an activator (C) and at least one polyethyleneimine (D), and
    s2) comprising at least one lactam (A) and at least one catalyst (B),
  (b) injecting the combined melts s1) and s2) into a hot mold with inserted textile structure,
  (c) ejecting the resulting molding from the mold.

Mixing operations can be carried out in a static or dynamic mixer.

The composition according to the present invention is not limited with regard to the type of molds in which it can be used. Especially molds for preparing thin-walled molded articles, in which the melts have to travel long flow paths, are obtainable via the described process in a particularly efficient manner.

Further adds such as demolding agents or viscosity enhancers can possibly be added when mixing the melts.

The residence time of the molding in the mold is dependent on the circumstances of the individual case, for example the injection temperature and the complexity of the molding. Typical residence times can range from seconds to double-digit minutes. Residence times can be in the range from 30 sec to 10 min for example. After the residence time has elapsed, the molding is ejected from the mold.

The temperature of the mold depends on the circumstances of the individual case, especially on the components used and the complexity of the molding. A hot mold is typically a mold having a temperature of 90 to 250° C. and especially of 100 to 200° C.

A textile structure for the purposes of the invention may be an association of fibers or fiber bundles. It may have one or more than one ply. It may be for example a woven, formed-loop knit, braid, drawn-loop knit, laid scrim or nonwoven. A textile structure in the present invention comprises wovens comprising at least one ply, preferably more than one ply, single- or multi-ply drawn-loop knits, single- or multi-ply formed-loop knits, single- or multi-ply braids, laid scrims, at least one ply, preferably two or more plies, of parallel-aligned fibers, fiber bundles, yarns, threads or cordage, where the individual plies of parallel-aligned fibers or fiber bundles of yarns, threads or cordage can be rotated relative to each other, or nonwovens. Preferably, the textile structures are in the form of wovens or in the form of plies of parallel-aligned fibers or fiber bundles such as yarns, threads or cordage.

When, in the case of laid scrims, the plies of parallel-aligned fibers or fiber bundles such as yarns, threads or cordage are rotated relative to each other, the individual plies are each more preferably rotated by an angle of 90° relative to each other (bidirectional construction). When three plies or a multiple of three plies are used, it is also possible to arrange the angle of rotation between the individual plies to be 60°, and in the case of four plies or multiples of four plies, the angle of relative rotation to each other can be 45°. It is further also possible to provide for more than one ply of fibers or fiber bundles to have the same alignment. In this case, plies can likewise be rotated relative to each other, in that the number of plies comprising fibers or fiber bundles in equal alignment can be different in each of the alignment directions of the fibers or fiber bundles, for example four plies in a first direction and one ply in a direction rotated thereto by 90° for example (bidirectional construction with preferential direction). A quasi-isotropic construction is also possible, in which case the fibers of a second ply are rotated by 90° relative to fibers or fiber bundles of a first ply and, furthermore, fibers or fiber bundles of a third ply are rotated by 45° relative to the fibers or fiber bundles of the second ply.

It is particularly preferable to produce fiber-reinforced moldings using textile structures in from 2 to 10 plies and especially in from 2 to 6 plies.

The textile structures used preferably comprise fibers composed of inorganic minerals such as carbon, for example as low-modulus carbon fibers or high-modulus carbon fibers, silicatic and non-silicatic glasses of various kinds, boron, silicon carbide, potassium titanate, metals, metal alloys, metal oxides, metal nitrides, metal carbides or silicates, and also organic materials such as natural or synthetic polymers, for example polyacrylonitriles, polyesters, ultra-highly drawn polyolefin fibers, polyamides, polyimides, aramids, liquid crystal polymers, polyphenylene sulfides, polyether ketones, polyether ether ketones, polyetherimides, cotton, cellulose or other natural fibers, for example flax, sisal, kenaf, hemp or abaca. Preference is given to high melting point materials, for example glasses, carbon, aramids, potassium titanate, liquid crystal polymers, polyphenylene sulfides, polyether ketones, polyether ether ketones and polyetherimides and particular preference to glass fibers, carbon fibers, aramid fibers, steel fibers, potassium titanate fibers, ceramic fibers and/or other sufficiently heat-resistant polymeric fibers or strands.

It will be appreciated that the textile structures can also be constructed of fibers differing in material.

EXAMPLES

Embodiments of the invention will now be more particularly described without the invention being restricted thereto.

Measuring the Molar Mass (GPC):

GPC measurements were carried out using pumps and detectors from Agilent. By way of columns, HFIP-LG Guard, HTS PL HFIP Gel and PL HFIPgel were used in an oven (40° C.). The eluent was hexafluoroisopropanol with 0.05% of potassium trifluoroacetate and the flow rate was 1 ml/min. Calibration was done using narrowly distributed PMM standards from PSS.

The insoluble gel-type fraction was determined to see whether the molecular weight is sufficiently high and there is crosslinking. To this end, 1.5 mg of polymer were made up in 1 ml of hexafluoroisopropanol and stirred at 45° C. for at least 4 h. Insoluble gel-type fractions were filtered off through a Millipore Millex FG disposable filter (0.2 μm) before any GPC measurement. After filtration, 100 μL of sample solution were injected into the GPC instrument. The insoluble gel-type fraction was computed from a known reference factor for an anionic polyamide in hexafluoroisopropanol, said reference factor representing the ratio of signal area to sample weight.

Swelling Test of Crosslinked Polyamide Using nylon-6 as an Example

The swelling test of crosslinked nylon-6 was characterized via the equilibrium swellability Q. Q is defined as the quotient of the swollen final volume $V_f$ in hexafluoroisopropanol (HFIP) to the collapsed initial volume $V_i$, and in accordance with formula I can also be reported as the quotient of weight fractions of network in initial and final gels, $m_i/m_f$, where $\rho_{HFIP}$ (=1.452 g/ml) and $\rho_{PA6}$ (=1.452 g/ml) represent the density of the solvent and the density of the nylon-6 obtained by anionic polymerization, respectively.

$$Q = \frac{V_f}{V_i}$$

$$= \frac{\frac{m_{hfip}}{d_{hfip}} + \frac{m_f}{d_{PA6}}}{\frac{m_f}{d_{PA6}}}$$

$$= 1 + \frac{m_{hfip}}{m_f} \times \frac{d_{PA6}}{d_{hfip}}$$

$$= 1 + \left(\frac{m_f - m_i}{m_f}\right) \times \frac{d_{PA6}}{d_{hfip}}$$

$$= 1 + \left(1 - \frac{m_i}{m_f}\right) \times \frac{d_{PA6}}{d_{hfip}}$$

Linear PA6 without crosslinking is completely soluble and thus has a $V_f$ value of 0 and hence Q=0. A completely crosslinked nylon-6 (PA6) will not dissolve at all, hence $V_f$ is =$V_i$ and Q is =1. Any values are possible for partly crosslinked nylon-6 (PA6), the degree of crosslinking increasing with decreasing Q and the closer Q is to 1. The swell test is carried out at 25° C.

Viscosities

Viscosities η were determined using a Physica MCR301 rotary viscosimeter at temperatures of 80° C., 100° C. and 150° C. For this, the polyethyleneimine was dissolved in molten caprolactam (melting point 70° C.).

Kinetics

A thermosensor was used to measure the evolving internal temperature over a period of 15 min. This was used to prepare a temperature-time diagram which typically shows two exothermic peaks for a standardized anionic polymerization (without further additives): one peak for the polymerization and one peak for the crystallization. The time ($t_{max}$) to reach the maximum temperature ($T_{max}$) of the polymerization peak was used in each case as reference point to assess the reaction rates of a standardized anionic polymerization and a polymerization in the presence of additives.

Anionic Polymerizations in Calorimeter (Without Fibers):

The polymerization reactions were all carried out at 140° C. under agitation in dry nitrogen in a 50 ml glass calorimeter reactor sealed with a grease-free Teflon stopper and equipped with a thermocouple. The results are given in Table 1. Example 1 below details the experimental procedure.

Reaction Injection Molding (RIM) Process

In the reaction injection molding process, two or more components were intensively mixed in a mixer and immediately thereafter injected as a reactive mass into a mold. The polymerization took place in the mold. A further advantage with RIM are the low viscosities of the processed melts. This makes it possible to achieve longer flow paths and more complex moldings. See also K. Stoeckhert (ed.): Kunststoff-Lexikon, Munich, Vienna, Hanser 1981.

Input Materials

Activator: Brüggolen® C20 (80% caprolactam-blocked 1,6-hexamethylene diisocyanate in caprolactam, Brüggemann K G, Heilbronn)

Catalyst: Brüggolen® C10 (18% sodium caprolactam in caprolactam, Brüggemann K G, Heilbronn)

Woven glass filament fabric: basis weight 280.0 g/m²±5% determined to DIN EN 12127, warp yarn EC9-68x3 t0, weft yarn EC9-204, 7.0 ends/cm±5%, 6.5 picks/cm±5% determined to DIN EN 1049, moisture content below 0.1%±1% determined to DIN EN 3616, thickness (guideline value dry), 0.35 mm±5% determined to DIN ISO 4603/E.

Polyethyleneimine

Mw=25 000 g/mol, determined from GPC with light scattering in hexafluoroisopropanol (HFIP) at 40° C., ratio of primary:secondary:tertiary amino groups=1:1.20:0.76; 1 g of polyethyleneimine used comprised 16.87 mmol of NH and/or NH$_2$ groups)

Comparative Example 1

9.400 g of caprolactam and 0.200 g of Brüggolen® C20 (80% caprolactam-blocked 1,6-hexamethylene diisocyanate in caprolactam, Brüggemann K G, Heilbronn) activator were dissolved in the reactor at 140° C. Thereafter, 0.400 g of Brüggolen C10 (18% sodium caprolactam in caprolactam, Brüggemann K G, Heilbronn) catalyst was added as solid at RT into the liquid melt. A thermosensor was then used to measure the evolving internal temperature over a period of 15 min. Thereafter, the anionic polymerization was quenched by cooling the reactor in water (10° C.).

Swell Test:

1 g of the polymer obtained was poured into 50 mL of hexafluoroisopropanol (HFIP) at room temperature under agitation. After 5 minutes the solution became transparent and homogeneous. After filtration, the polymer was completely recovered from the filtrate by removing the solvent to constant weight, suggesting that the linear PA6 was completely soluble in HFIP. Q=0

Comparative Example 2

The polymerization batch of comparative example 1 was repeated at 155° C. The resulting polymer likewise had scarcely any crosslinks.

The experimental results show that the present invention's addition of polyethyleneimines to the activated anionic polymerization provides polyamides having a comparatively high degree of crosslinking.

Example 3

9.370 g of caprolactam and 0.031 g of polyethyleneimine were dissolved in the reactor at 140° C. Thereafter, 0.200 g of Brüggolen® C20 (80% caprolactam-blocked 1,6-hexamethylene diisocyanate in caprolactam, Brüggemann K G, Heilbronn) activator was added as a solid to the liquid melt at RT. The mixture was stirred at 140° C. for 15 min. Then, 0.400 g of Brüggolen® C10 (18% sodium caprolactam in caprolactam, Brüggemann K G, Heilbronn) catalyst was added as solid at RT into the liquid melt. A thermosensor was used to measure the evolving internal temperature over a period of 15 min. Thereafter, the anionic polymerization was quenched by cooling the reactor in water (10° C.). The polymer blend formed is highly crosslinked, the filtered-off gel-type fractions amount to 89%.

1 g of the polymer obtained was poured into 50 mL of hexafluoroisopropanol (HFIP) at room temperature under agitation. After 10 h a gel-type structure was obtained. After filtration, the polymer was recovered on the filter, whereas no polymer was detectable in the filtrate after evaporation, revealing that the PA6 was HFIP insoluble and crosslinked. The degree of swelling of the polyamide obtained was 29.

Examples 4 and 5

Example 3 was repeated except that in each case 0.57% and 0.94% of Lupasol WF and 0.400 g and 0.600 g respectively of Brüggolen® C20 activator were used.

TABLE 1

| Example | comp. 1 | 3 | 4 | 5 |
|---|---|---|---|---|
| Lactam (wt %) | 94 | 93.7 | 91.5 | 89.0 |
| polyethyleneimine (wt %) | — | 0.31 | 0.57 | 0.94 |
| C10 catalyst (wt %) | 4 | 4 | 4 | 4 |
| C20 activator (wt %) | 2 | 2 | 4 | 6 |
| NH and/or NH2 group amount of substance (mmol) | — | 0.523 | 0.962 | 1.586 |
| NCO groups amount of substance (mmol) | 0.81 | 0.81 | 1.62 | 2.43 |
| NCO/(NH and/or NH2) ratio | — | 1.55 | 1.68 | 1.53 |
| NCO-(NH and/or NH2) difference (mmol) | — | 0.287 | 0.658 | 0.844 |
| NCO excess (wt %) | 2 | 0.71 | 1.52 | 2.08 |
| Tmax (° C.) | 186.7 | 182.0 | 185.3 | 185.7 |
| tmax (s) | 78 | 96 | 76 | 78 |
| η [mPa · s] 80° C. | 8.8 | 9.2 | 13.6 | 15.0 |
| η [mPa · s] 100° C. | 4.9 | 5.1 | 6.8 | 8.2 |
| η [mPa · s] 150° C. | 2.0 | 2.2 | 3.1 | 4.0 |

TABLE 1-continued

| Example | comp. 1 | 3 | 4 | 5 |
|---|---|---|---|---|
| filtered-off gel-type fractions (%) | 10 | 89 | 100 | 95 |
| Q degree of swelling | 0 | 29 | 14 | 4 |

The experimental results show that the present invention's addition of polyethyleneimines to the activated anionic polymerization provides polyamides having a comparatively high degree of crosslinking.

Preparation of Fiberglass-Reinforced Plates:

Molded glassfiber-reinforced polyamide articles were prepared by reaction injection molding (RIM) in a mold carrier which was heatable. To this end, the various components were made up in a casting machine from Tartler in Michelstadt. The casting machine consisted of three containers each having a capacity of 20 liters and each equipped with a pump capable of pumping 40-400 ccm/min. In accordance with RIM technology, the various components were mixed in a ratio of 1:1 in a dynamic mixer (mixing temperature: 122° C.) at 6000 rpm. The mixture was introduced into a closed mold heated to 155° C. and filled with 8 plies of Interglas 92125 fibers (sized with FK801). This mold had dimensions of 340×340×4 mm and a capacity of 360 cm³. After 10 min reaction in the mold, the ready-produced molding was removed. The results are given in Table 2. The examples below detail the experimental procedure.

TABLE 2

| Example | comp. 1 | 6 | 7 |
|---|---|---|---|
| Lactam (wt %) | 94 | 91.5 | 89 |
| polyethyleneimine (wt %) | — | 0.5 | 1.0 |
| C10 catalyst (wt %) | 4 | 4 | 4 |
| C20 activator (wt %) | 2 | 4 | 6 |
| NH and/or NH2 group amount of substance (mol) | — | 0.844 | 1.687 |
| NCO groups amount of substance (mol) | 0.81 | 1.62 | 2.43 |
| NCO/(NH and/or NH2) ratio | — | 1.92 | 1.44 |
| NCO-(NH and/or NH2) difference (mol) | — | 0.776 | 0.743 |
| NCO excess (wt %) | 2 | 1.92 | 1.83 |
| filtered-off gel-type fractions (%) | 29 | 83 | 91 |

Comparative Example 6

Preparing a Molded Polyamide Article

Composition of Container A:
200 g of Brüggolen® C20 (2 wt %)
4780 g of caprolactam (47.8 wt %)
20 g of calcium stearate (0.2 wt %)
Composition of Container B:
400 g of Brüggolen® C10 (4 wt %)
4600 g of caprolactam (46 wt %)
Brüggolen® C20 (80% caprolactam-blocked 1,6-hexamethylene diisocyanate in caprolactam, Brüggemann K G, Heilbronn) activator and Brüggolen® C10 (18% sodium caprolactam in caprolactam, Brüggemann K G, Heilbronn) catalyst were added as solids to the fresh caprolactam melts at 112° C. in containers A and B under agitation and under $N_2$. Container A additionally has added to it 0.2% of calcium stearate as internal demolding agent. Then, the two mixtures were injected in a ratio of 1:1 into the closed mold carrier heated to 155° C. and filled with Interglas 92125 fibrous fabric (sized with FK800). After 10 min at 155° C. in the mold, the ready-produced molding was removed without demolding problems. The plate obtained had a smooth surface and was free of discolorations.

Example 7

Composition of Container A:
400 g of Brüggolen® C20 (4 wt %)
4555 g of caprolactam (45.55 wt %)
20 g of calcium stearate (0.2 wt %)
25 g of Lupasol® WF (0.5 wt %)
Composition of Container B:
400 g of Brüggolen® C10 (4 wt %)
4600 g of caprolactam (46 wt %)
25 g of Lupasol® WF were dissolved in container A in 4755 g of caprolactam under agitation within 5 min at 140° C. under $N_2$. Then, 400 g of Brüggolen® C20 (80% caprolactam-blocked 1,6-hexamethylene diisocyanate in caprolactam, Brüggemann K G, Heilbronn) activator were added as solid at 20° C. Concurrently, 400 g of Brüggolen® C10 (18% sodium caprolactam in caprolactam, Brüggemann K G, Heilbronn) catalyst were added as solid at 20° C. to 4600 g of caprolactam melt in container B. Then, the two mixtures were injected in a ratio of 1:1 into the closed mold carrier heated to 155° C. and filled with Interglas 92125 fibrous fabric (sized with FK800). After 10 min at 150° C. in the mold, the ready-produced molding was removed without demolding problems. The plate obtained had a smooth surface and was free of discolorations. The polymer matrix formed has a high degree of crosslinking, the filtered-off gel-type fractions amount to 83%.

Example 8

Composition of Container A 600 g of Brüggolen® C20 (6 wt %)
4330 g of caprolactam (43.30 wt %)
20 g of calcium stearate (0.2 wt %)
50 g of Lupasol® WF (1.0 wt %)

Composition of Container B 400 g of Brüggolen® C10 (4 wt %)
4600 g of caprolactam (46 wt %)
Example 7 was repeated except that 1.0% of Lupasol® WF and 6% of Brüggolen® C20 activator were added.

The experimental results show that the present invention's addition of polyethyleneimines to the activated anionic polymerization provides polyamides having a comparatively high degree of crosslinking. Only the low molar mass fractions are still soluble.

We claim:
1. A process for preparing a composition comprising
(A) at least one lactam,
(B) at least one catalyst which is a compound enabling the formation of lactam anions,
(C) an activator selected from the group consisting of isocyanates, acid anhydrides, acyl halides, reaction products thereof with (A) and mixtures thereof,
(D) at least one polyethyleneimine; the process comprising mixing melts
s1) comprising a portion of the at least one lactam (A), the activator (C), and the at least one polyethyleneimine (D), and
s2) comprising the remainder of the at least one lactam (A) and the at least one catalyst (B).
2. The process according to claim 1 wherein the ratio of reactive groups of activator (C) to NH and/or $NH_2$ groups of polyethyleneimine (D) is in the range from 1:2 to 10:1.
3. The process according to claim 1 wherein polyethyleneimine (D) has a weight average molecular weight in the range from 100 to 3 000 000 g/mol as determined by light scattering.
4. The process according to claim 1 wherein polyethyleneimine (D) has a primary and/or secondary amino functionality of 10 to 70 000 per chain.
5. The process according to claim 1 wherein components (A) to (D) are exposed to a temperature of 40 to 240° C.
6. A process for preparing a polyamide by preparing a composition comprising
(A) at least one lactam,
(B) at least one catalyst which is a compound enabling the formation of lactam anions,
(C) an activator selected from the group consisting of isocyanates, acid anhydrides, acyl halides, reaction products thereof with (A) and mixtures thereof,
(D) at least one polyethyleneimine;
the process comprising mixing melts
s1) comprising a portion of the at least one lactam (A), the activator (C), and the at least one polyethyleneimine (D), and
s2) comprising the remainder of the at least one lactam (A) and the at least one catalyst (B);
wherein the polyamide is a highly crosslinked polyamide.

* * * * *